(12) United States Patent
Simpson et al.

(10) Patent No.: US 10,172,341 B2
(45) Date of Patent: Jan. 8, 2019

(54) ANIMAL BARRIER AND METHOD

(71) Applicant: SIMPSON-TURNER LTD, Eccleshill, Bradford (GB)

(72) Inventors: Paul Simpson, Bradford (GB); Richard Turner, Bradford (GB)

(73) Assignee: Simpson-Turner Ltd., Eccleshill, Bradford (GB)

( * ) Notice: Subject to any disclaimer, the term of this patent is extended or adjusted under 35 U.S.C. 154(b) by 220 days.

(21) Appl. No.: 14/900,750

(22) PCT Filed: Jun. 5, 2014

(86) PCT No.: PCT/GB2014/051734
§ 371 (c)(1),
(2) Date: Dec. 22, 2015

(87) PCT Pub. No.: WO2015/001299
PCT Pub. Date: Jan. 8, 2015

(65) Prior Publication Data
US 2016/0198692 A1    Jul. 14, 2016

(30) Foreign Application Priority Data
Jul. 1, 2013 (GB) .................................. 1311722.1

(51) Int. Cl.
*A01M 1/14* (2006.01)
*A01M 1/10* (2006.01)
(Continued)

(52) U.S. Cl.
CPC .............. *A01M 1/14* (2013.01); *A01M 1/103* (2013.01); *A01M 23/005* (2013.01); *A47B 91/14* (2013.01)

(58) Field of Classification Search
CPC ...... A01M 1/14; A01M 1/103; A01M 23/005; A47B 91/14
See application file for complete search history.

(56) References Cited

U.S. PATENT DOCUMENTS 140,954 A * 7/1873 Rubarth ................ A01M 1/103
43/121
635,813 A * 10/1899 Shulmeister ............ A01M 1/14
43/117
(Continued)

FOREIGN PATENT DOCUMENTS

CA        2148032 A1    10/1996
DE   102010051212 A1     6/2011
(Continued)

OTHER PUBLICATIONS

International Report on Patentability issued in related International Patent Application No. PCT/GB2014/051734 dated Jan. 5, 2016 (5 sheets).
(Continued)

*Primary Examiner* — Christopher P Ellis
(74) *Attorney, Agent, or Firm* — Gesemer Updegrove LLP

(57) ABSTRACT

The invention relates to a barrier for inhibiting the migration of crawling animals such as insects. The barrier comprises a body that is configured to encircle a leg/wheel of a furniture item and thereby intercept any crawling insects. The body has an annular shape defined by an outer boundary and an inner aperture, in which the leg/wheel of the furniture item can be located. The barrier includes inimical means to inhibit the migration of any crawling insects across the body. The barrier further comprises a slit extending radially from the boundary to the aperture so that the body can be reversibly opened and closed. The slit advantageously allows the body to be opened and closed around the leg/wheel of the furniture item during installation. Likewise, the slit allows the device to be reopened and extracted from around the leg/wheel of the furniture item during removal. As a result, the device can be installed, removed, replaced or retrofitted easily and quickly without having to lift, move (Continued)

and/or disassemble the furniture item. The invention further relates to a method of inhibiting the migration of crawling insects by mounting the said barrier around a leg/wheel of a furniture item, relates to a kit comprising a plurality of barriers and relates to a furniture item protected from crawling insects where a said barrier is mounted for use around a leg/wheel of the furniture item.

11 Claims, 9 Drawing Sheets

(51) Int. Cl.
*A01M 23/00* (2006.01)
*A47B 91/14* (2006.01)

(56) References Cited

U.S. PATENT DOCUMENTS

| | | | | |
|---|---|---|---|---|
| 675,338 A * | 5/1901 | Nobbs | ............... | A01M 1/14 43/114 |
| 836,634 A * | 11/1906 | Corbett | ............... | A01M 1/14 43/115 |
| 935,428 A * | 9/1909 | Strazenbach | ............... | A01M 1/14 43/114 |
| 1,480,539 A * | 1/1924 | Grecu | ............... | A01M 1/02 43/114 |
| 1,674,118 A | 6/1928 | Merrick | | |
| 4,555,866 A | 12/1985 | Stone | | |
| 5,031,354 A * | 7/1991 | Olson | ............... | A01M 1/02 43/114 |
| 6,223,463 B1 | 5/2001 | Carlson et al. | | |
| 7,171,778 B1 * | 2/2007 | Thompson | ............... | A01M 1/14 43/107 |
| 2012/0210628 A1 * | 8/2012 | Park | ............... | A01M 1/14 43/114 |
| 2013/0036664 A1 * | 2/2013 | Nicholas | ............... | A01G 13/10 47/32 |
| 2015/0020438 A1 * | 1/2015 | Work | ............... | A01M 1/14 43/114 |
| 2016/0262366 A1 * | 9/2016 | Rola | ............... | A01M 1/14 |

FOREIGN PATENT DOCUMENTS

| | | |
|---|---|---|
| EP | 0087134 A1 | 8/1983 |
| FR | 2638058 A1 | 4/1990 |
| GB | 2262424 A | 6/1993 |
| GB | 2291329 A | 1/1996 |
| GB | 2446560 A | 8/2008 |
| WO | 03050083 A2 | 6/2003 |

OTHER PUBLICATIONS

Written Opinion of the International Search Authority issued in related International Patent Application No. PCT/GB2014/051734 dated Jan. 1, 2016 (4 sheets).
International Search Report issued in related International Patent Application No. PCT/GB2014/051734 dated Jan. 8, 2015 (4 sheets).
Search Report issued in related British Patent Application No. GB1409972.5.
Search Report issued in related GB Patent Application No. 1409972.5 by British Intellectual Property Office dated Nov. 10, 2014.
Examination Report issued in related GB Patent Application No. 1409972.5 by British Intellectual Property Office dated Mar. 20, 2017.
Examination Report issued in related GB Patent Application No. 1409972.5 by British Intellectual Property Office dated Jul. 3, 2017.
Examination Report issued in related EP Patent Application No. 14739908.3 by European Patent Office dated Sep. 9, 2017.

* cited by examiner

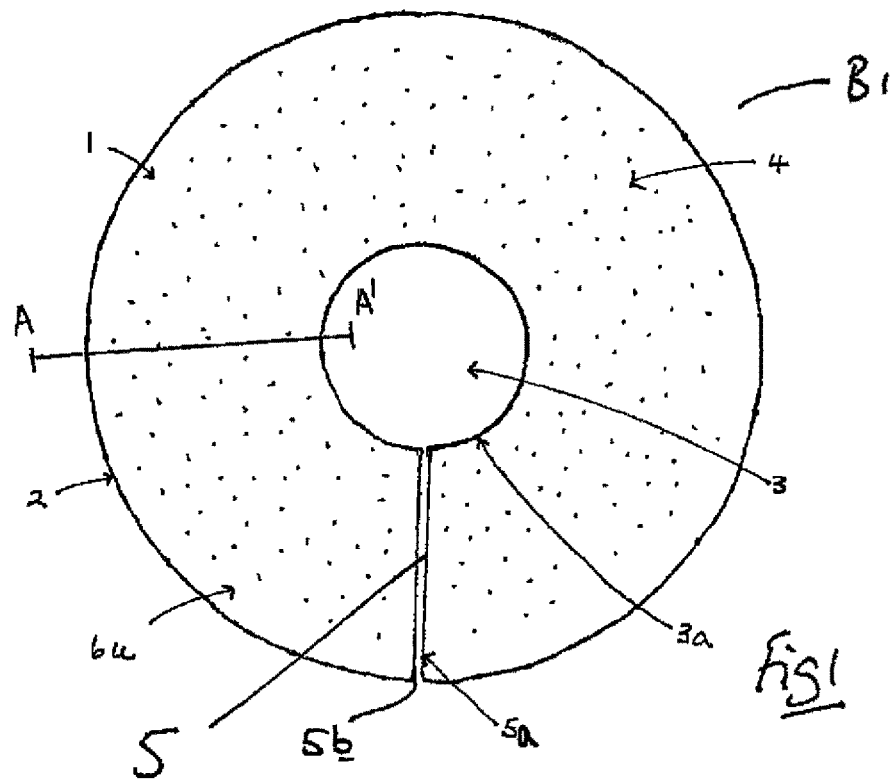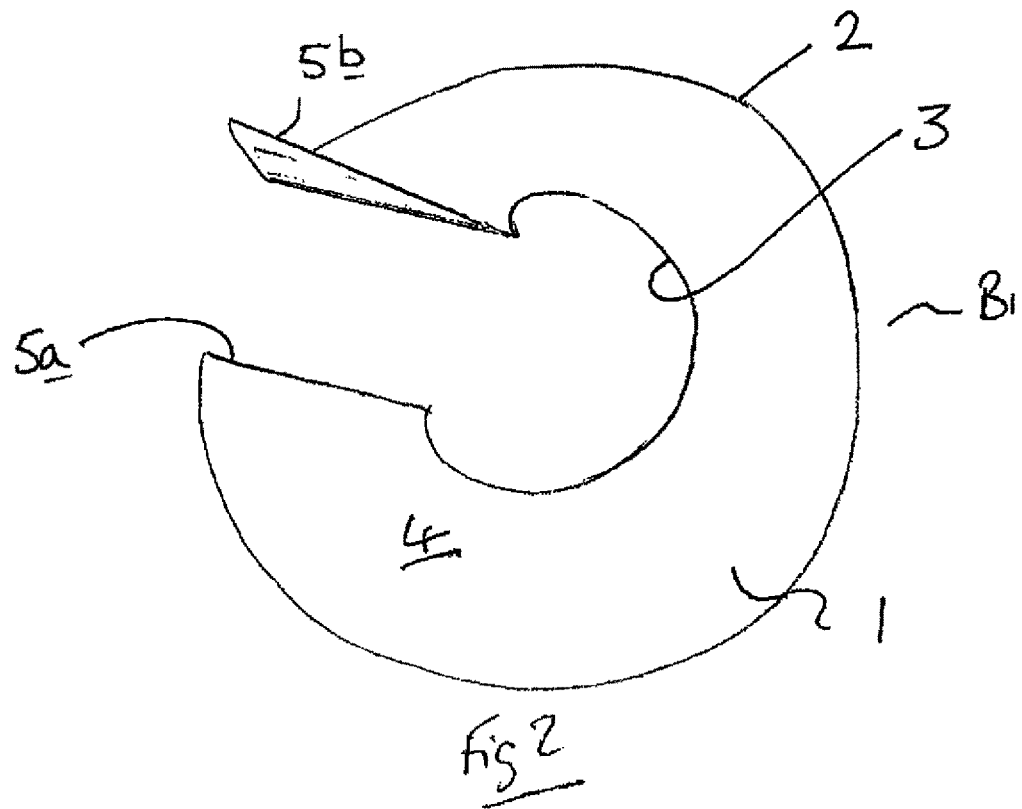

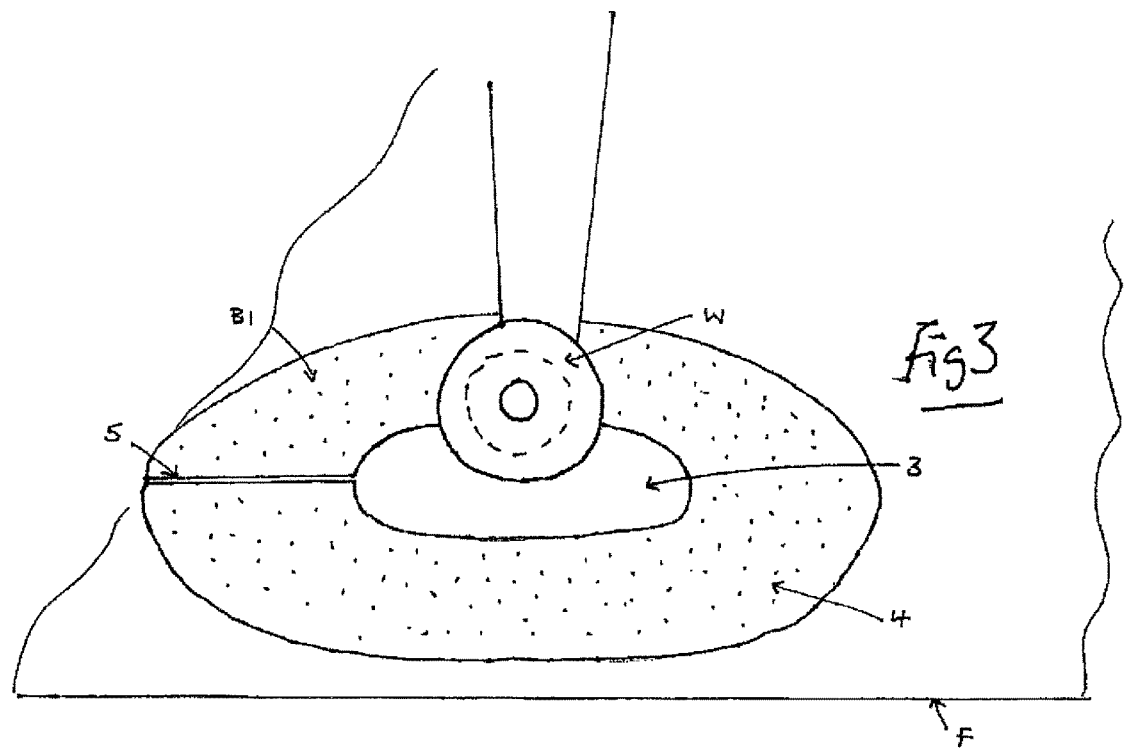
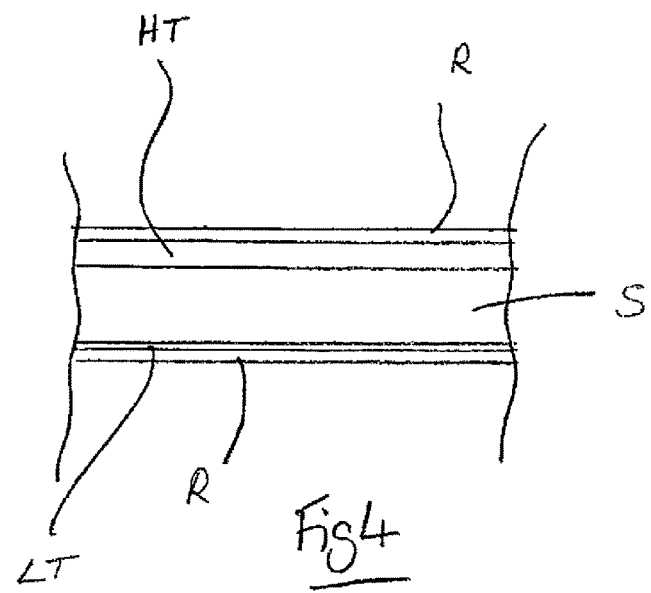

ANIMAL BARRIER AND METHOD

PRIORITY INFORMATION

The present invention claims priority to PCT Application No. PCT/GB2014/051734 filed Jun. 5, 2014, that claims priority to GB Application No. 1311722.1, filed on Jul. 1, 2013, both of which are incorporated herein by reference in their entireties.

The present invention relates to a barrier and a method for inhibiting the access of crawling animals to an article.

Barriers for inhibiting the migration of crawling animals, such as insects to a furniture item are well known. Such barriers are typically arranged in cooperation with a leg or wheel of the furniture item so as to intercept a crawling insect.

Certain known barriers comprise a surface having a low coefficient of friction to impede the crawling of the insects, as described for example in U.S. Pat. No. 528,210 where the barrier is a glass annulus arranged between the stem and wheel of a caster wheel for a furniture item. U.S. patent application Ser. No. 13/380,057 describes how bed bugs are unable to gain access to a bed when a Teflon disc is interposed between the upper portion of a bed leg and the underside of a bed base.

Other known barriers include an adhesive portion to which crawling insects stick. U.S. patent application Ser. No. 13/029,288 describes an adhesive insect-trapping device that is arranged between a floor and a bed leg. GB patent application 1111985.6 describes how a bed leg can be placed in a cup-shaped container where a perimeter lip of the container is coated in a tacky substance to trap crawling insects.

Although some of the previously considered barriers may be effective in inhibiting crawling insects, these barrier designs can only be installed or removed by lifting, moving dismantling and/or adapting an article of furniture. Accordingly, the installation or removal of these types of barriers is time consuming, often requires strenuous effort and may also necessitate the use of special tools.

Embodiments of the present invention aim to provide a barrier device and method for inhibiting access of a crawling animal to an article, in which at least some of the shortcomings of the prior art at least partly overcome.

The present invention is defined in the attached independent claims, to which reference should now be made. Further, preferred features may be found in the sub-claims appended thereto.

According to one aspect of the present invention, there is provided a barrier device for inhibiting access of a crawling animal to an article, the device comprising a substrate having a barrier surface for impeding the motion of a crawling animal across the substrate, and wherein the device is configurable in a first, operational configuration in which the barrier surface extends substantially continuously around an article, and a second, installation configuration in which a discontinuity is formed in the substrate to permit engagement with an article.

In a preferred embodiment the substrate is generally laminar.

Preferably the barrier surface comprises an adhesive surface for adhering to a crawling animal, thereby to impede its motion across the substrate.

Alternatively, or in addition, the barrier surface may comprise a low-friction surface for denying traction to a crawling animal, thereby to inhibit its motion across the substrate.

Preferably the device is arranged to be put into the second configuration by deflection of at least a part of the device out of plane.

The device may comprise an aperture for accommodating at least a part of an article in the first, operational configuration.

In a preferred embodiment the device comprises a slit, perforation or line of weakness extending at least part way through the substrate to an edge region thereof, for partly separating the substrate into two portions.

Preferably the slit, perforation or line of weakness extends from the aperture to an edge region of the substrate.

The device may be arranged to be put into the second configuration by at least partly separating the substrate into two portions.

Preferably the substrate is generally annular in the first, operational configuration.

The device may have a locating surface on an opposed side of the substrate from the barrier surface.

The locating surface may comprise an adhesive surface for adhesion to a support such as a floor surface in use.

Preferably the barrier device is for use with an article comprising a foot, leg or wheel of an article of furniture.

In a preferred embodiment the substrate comprises one or more flap portions adjacent the aperture for contacting an article in the aperture.

The flap portion may be moveable between a first configuration in which it extends substantially in-plane with respect to the substrate and a second configuration in which it extends substantially out-of plane with respect to the substrate.

Preferably, in the second configuration the flap is angled in use to abut an article in the aperture.

The invention also provides a method of inhibiting access of a crawling animal to an article, the method comprising substantially surrounding the article with a barrier device comprising a substrate having a barrier surface for impeding the motion of a crawling animal across the substrate, and wherein the method comprises changing the device between a first, operational configuration in which the barrier surface extends substantially continuously around an article, and a second, installation configuration in which a discontinuity is formed in the substrate to permit engagement with and/or withdrawal from an article.

The method may comprise causing a crawling animal to adhere to the barrier surface, thereby to impede its motion across the substrate.

Alternatively or additionally the method may comprise denying traction to a crawling animal on the barrier surface, thereby to inhibit its motion across the substrate.

In a preferred arrangement, the method comprises putting the device into the second configuration by deflecting of at least a part of the device out of plane.

Preferably the method comprises partly separating the substrate into two portions at a slit, perforation or line of weakness extending at least part way through the substrate to an edge region thereof.

The method may comprise at least temporarily affixing the device to a floor surface with a locating surface on an opposed side of the substrate from the barrier surface.

The invention also provides a kit of parts for preparing and installing a barrier device for inhibiting access of a crawling animal to an article, the kit comprising at least one length of barrier material comprising a substrate having a barrier surface for impeding the motion of a crawling animal across the substrate, and wherein the barrier material is configurable in a first, operational configuration in which the barrier surface extends substantially continuously around an article.

The kit preferably comprises plural lengths of barrier material and/or a continuous length of barrier material which may be cut or torn to desired lengths. The barrier material may be a barrier device in accordance with any of the statements herein.

A first aspect of the present invention relates to a barrier for inhibiting the migration of crawling insects.

Preferably, the barrier comprises a body that is configured to encircle a leg/wheel of a furniture item and thereby intercept any crawling insects.

Preferably the body has an annular shape defined by an outer boundary and an inner aperture, in which the leg/wheel of the furniture item can be located.

Preferably the barrier includes inimical means to inhibit the migration of any crawling insects across the body.

Preferably, the barrier further comprises a slit extending radially from the boundary to the aperture so that the body can be reversibly opened and closed.

The slit advantageously allows the body to be opened and closed around the leg/wheel of the furniture item during installation. Likewise, the slit allows the device to be reopened and extracted from around the leg/wheel of the furniture item during removal. As a result, the device can be installed, removed, replaced or retrofitted easily and quickly without having to lift, move and/or disassemble the furniture item.

The slit may allow the body to be mounted on a floor supporting the furniture item, encircling a base portion of the leg/wheel of the furniture item. Accordingly, any crawling insects must cross the barrier to reach the leg/wheel of the furniture item.

The slit may allow the body to be mounted on and encircle a portion of the leg/wheel of the furniture item. As a consequence, the barrier intersects the pathway of any crawling insects on the leg/wheel of the furniture item.

The body may have any suitable annular shape. The body may have a regular annular shape or a non-regular annular shape.

The body may be an annular shaped disc having a substantially flat and thin profile.

The inimical means may comprise any suitable means that are hostile to crawling insects. For example, the inimical means may comprise a first adhesive to adhere any crawling insects as they try to traverse the body. The inimical means may comprise a layer (coating) of the first adhesive applied to a surface region of the body over which crawling insects will try to crawl when the barrier is mounted for use. The barrier may comprise a first release liner for removably covering the first adhesive layer. The inimical means may additionally or alternatively comprise a surface region of the body, over which crawling insects will try to crawl when the body is mounted for use, with a sufficiently low coefficient of friction so as to impede the traversing of crawling insects.

The inimical means may be deposited on, carried by or arranged in association with a first surface of the body. Depending on the mounting arrangement of the barrier, the first surface may be an upper surface of the body that faces upwardly towards the furniture item when the barrier is mounted for use. Alternatively, the first surface may be a lower surface of the body that faces downwardly towards the floor when the barrier is mounted for use.

The inner aperture of the body may have a predetermined shape and size that is defined by an inner edge of the body. Alternatively, the inner aperture may have a variable shape and size where the maximum configuration is defined by the inner edge of the body.

The barrier may comprise a plurality of movable flap portions extending radially from the inner edge of the body. The flap portions are moveable so as variably control the configuration of the aperture. As a result, the barrier may be used with a range of furniture items having different shapes and/or sizes of legs/wheels. The flap portions may enhance the fitting of the barrier around the leg/wheel. The flap portions allow the aperture to conform to the configuration of the leg/wheel.

Preferably the flap portions are individually moveable between a neutral position and a fully extended position. When arranged in the neutral position, the flap portions extend in a direction across the aperture so as to minimise the configuration of the aperture or at least substantially close the aperture. When arranged in the fully extended position, the flap portions are folded (bent) back to the inner edge of the body and extend in a direction away from the aperture to as to maximise the configuration of the aperture.

The flap portions are separated by slots. One of the slots is preferably contiguous with the slit so as not to restrict the opening of the body.

Depending on the mounting position of the barrier, the configuration of the flap portions and the configuration of the leg/wheel, the flap portions may form a skirt around the leg/wheel and/or extend along the floor when the barrier is mounted for use.

The barrier may comprise engaging means to maintain the position of the body when mounted for use. The engaging means may comprise a second adhesive to removably adhere the body to the floor and/or the leg/wheel of the furniture item. The second adhesive may be applied to a surface region of the body which forms a mating contact with the floor and/or the leg/wheel when the barrier is mounted for use. The surface region may be a lower surface of the body that forms a mating contact with the floor when the barrier is mounted for use on the floor, encircling the base of the leg/wheel. Additionally or alternatively, the second adhesive may be applied to one or more flap portions to removably adhere the flap portions to the floor and/or the leg/wheel of the furniture item. The barrier may comprise a second release liner removably covering the second adhesive layer.

The barrier may comprise at least one finger tab to facilitate the handling of the barrier.

The body may be resiliently flexible so that it is biased to remain closed unless a suitable force is applied on the body to open the slit. Optionally, the flap portions are resiliently flexibly so that they are biased towards the neutral position unless a force is applied to push them upwardly or downwardly away from the neutral position. The body may alternatively comprise closure means to maintain the body in a closed position.

The body may be transparent or translucent. As a consequence, the floor and the leg/wheel are not substantially obscured when the barrier is mounted for use, encircling the leg/wheel of the furniture item. Alternatively, the body may be opaque. The body may be coloured, patterned and/or branded so as to provide a decorative effect.

A second aspect of the invention relates to a method of inhibiting the migration of crawling insects comprising: providing a barrier according to the first aspect of the invention; and mounting the barrier for use such that it encircles a leg/wheel of a furniture item.

The step of mounting the barrier for use may comprise: opening the body of the barrier along the slit;

extending the open body around the leg/wheel until the leg/wheel is located within the aperture; and
closing the body to encircle the leg/wheel.

The step of mounting the barrier for use may further comprise arranging the body on a floor supporting the leg/wheel or on the leg/wheel.

In a further aspect the invention relates to a kit comprising a plurality of barriers according to the first aspect of the invention.

The kit may comprise barriers having the same configuration and/or features. The kit may comprise barriers having different configurations and/or features. For example, a kit may comprise barriers having a range of different sized and/or shaped bodies, a range of different size and/or shaped apertures, a plurality of individually movable flap portions/ no flap portions etc.

A still further aspect of the invention relates to a furniture item protected from crawling insects, the furniture item comprising a barrier according to the first aspect of the invention mounted for use around a leg/wheel of the furniture item.

The barrier may be mounted on the floor supporting the furniture item, encircling a base portion of the leg/wheel.

The barrier may be mounted on the leg/wheel of the furniture item, encircling a portion of the leg/wheel.

Preferred embodiments of the present invention will now be described. By way of example only, with reference to the accompanying diagrammatic drawings, in which:

FIG. 1 is a plan view of a first embodiment of a barrier for inhibiting the access of crawling animals according to the present invention;

FIG. 2 is a schematic view of the barrier of FIG. 1, in an alternative configuration;

FIG. 3 is a schematic perspective view of the barrier of FIG. 1 mounted on a floor, encircling a wheel of a bed;

FIG. 4 is a schematic sectional view through A-A' of FIG. 1;

Figure 5:
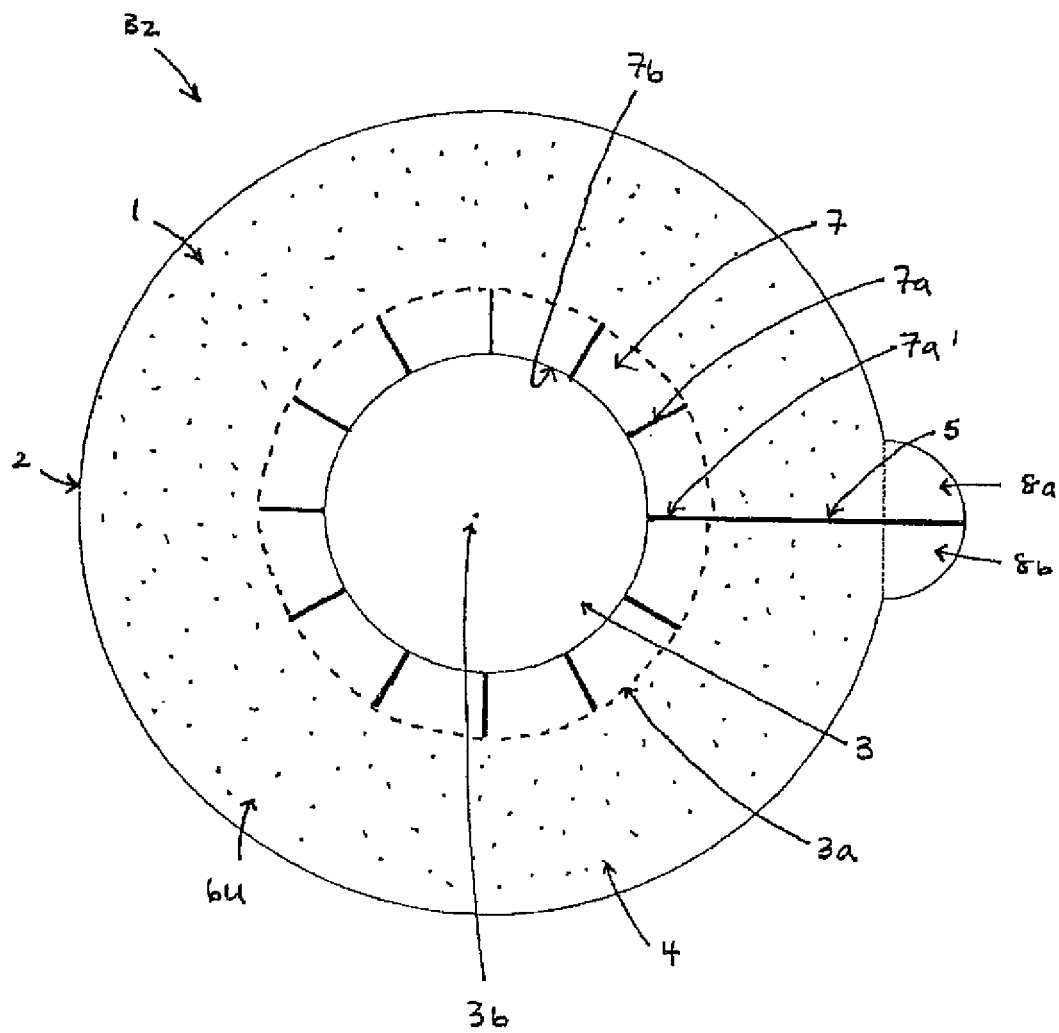
FIG. 5 is a plan view of a second embodiment of a barrier according to the present invention.

The invention relates to a barrier B for inhibiting the access of small crawling animals, such as insects, to an article, such as an article of furniture.

Referring to FIG. 1, the barrier is shown generally at B and comprises a laminar body 1 having an annular shape defined by an outer boundary 2 and an inner aperture 3.

The barrier comprises a barrier surface 4 which is arranged to inhibit the movement of crawling insects across the body.

The barrier comprises a slit 5 extending radially in the body from the boundary to the inner aperture so that the body can be reversibly opened and closed by deflecting or bending the body out of plane either side of the slit so that a gap is made between opposed portions 5a, 5b forming the slit, which gap is sufficient to receive a portion (not shown) of an article of furniture. FIG. 2 shows the body in such an open configuration.

Referring to FIG. 3, the barrier is configured to be mounted for use around the periphery of a leg L or wheel W of a furniture item such as a bed. As a result, the leg/wheel extends to the inner aperture in the body and maintains a contact with the floor immediately below. Due to the annular shape, the barrier extends radially from the leg/wheel. Consequently, the barrier is able to intercept crawling insects from every direction and thereby inhibit their access to the leg/wheel. Hence, the barrier is able to reduce the risk of an undesirable infestation of crawling insects in the furniture item.

In an alternative embodiment (now shown) the barrier may be configured such that it can be mounted on the leg/wheel itself, encircling a peripheral portion of the leg/ wheel.

It follows that the slit also allows the barrier to be dismounted from the article by reopening the body and extracting the open body from around the leg/wheel.

Accordingly, the barrier can be mounted for use or dismounted swiftly and straightforwardly without having to lift, move or disassemble the furniture item. The slit also allows the barrier to be replaced and retrofitted to a furniture item without any complexity.

The body 1 acts as a carrier substrate for carrying the barrier surface.

The body 1 may comprise any suitable flexible material that will allow the body to reversibly open and close along the slit. The body may comprise a resiliently flexible material such that the body is biased to remain closed unless a suitable force is applied on the body to open the slit.

The body 1 may comprise a thermoplastic film, such as polypropylene, polyester or any other suitable material such as paper. The body may for example comprise polyethylene terephthalate (PET).

The body 1 may be any suitable size and shape. The size and shape of the body may depend on the type, configuration and location of the furniture item. The body is preferably configured such that the barrier does not protrude too prominently beyond the edge of the furniture item. The diameter of the outer boundary may range from approximately 8 cm to 15 cm. The diameter of the inner aperture may range from approximately 5 cm to 10 cm. The body may be disc-like with a generally thin and flat profile. The disc body may have a thickness ranging from approximately 100 microns to 200 microns. The body may comprise an upper surface 6U that is configured to face upwardly towards the furniture item and a lower surface 6L that is configured to face downwardly towards the floor when the barrier is mounted for use. The body may have any suitable annular shape. For example, the body may have a regular annular shape or an irregular annular shape. The body may have a circular annular shape, a square annular shape or rectangular annular shape. The body may comprise at least one substantially straight edge such that the barrier can be aligned (arranged) adjacent or flush to a wall and/or another furniture item.

The body 1 may comprise a material that can be cut to a desirable size and shape by a user. Hence, the configuration of the barrier can be finalised on site according to the type, configuration and location of the furniture item.

The body 1 may be substantially transparent or translucent. As a result, the floor and/or the leg/wheel are at least substantially visible when the barrier is mounted for use. Alternatively, the body may be opaque. The body may be patterned or coloured so as to provide a decorative effect. The body may be branded using logos. The body may have printed instructions to aid the installation and/or removal of the barrier.

FIG. 4 is a schematic sectional view taken along lines A-A' of FIG. 1. The barrier comprises a substrate S which in this example is in the form of a carrier film of polypropylene. The substrate has a thickness of 125 µm. On an upper surface the substrate S has a high-tack layer HT as a barrier surface, which in this example comprises a coating of 40 g/m² rubber resin. Over the layer HT is a peelable silicone-backed release paper R. A lower surface of the substrate has a layer of low-tack adhesive LT, which in this example comprises a coating of 8 g/m² acrylic. Over the layer LT is a peelable silicone-backed release paper R.

As described above, the body comprises an aperture 3 in which the leg/wheel of the item of furniture is located when the barrier is mounted for use. The shape and position of the aperture within the body may depend on the type, the configuration and location of the leg/wheel. The aperture may have a regular or irregular shape. The aperture may have a substantially circular shape (see FIGS. 1 to 8), oval shape, square shape (see FIGS. 9 and 11) or rectangular shape (see FIG. 10). The aperture may be arranged substantially centrally in the body or alternatively, the aperture may be arranged eccentrically (off-centre) in the body.

The aperture 3 may have a predetermined shape and size that is defined by an inner circumferential edge 3a of the body as shown in FIGS. 1 to 3. In this embodiment, the aperture is formed by removing a circular central portion of the body.

The aperture 3 may have a variable shape and size, where the optimum (maximum) configuration of the aperture is defined by the inner edge 3a of the body.

The barrier may comprise a plurality of flap portions 7 extending radially from the inner edge 3a of the body (FIG. 5). The flap portions are individually movable so as to allow the aperture to change shape and/or size. As a result, the barrier is suitable for use with a variety of furniture items having different shaped and sized legs/wheels. The movable flap portions allow the aperture to conform to the configuration of the leg/wheel and thereby improve the fitting of the aperture around the leg/wheel.

The flap portions are formed by cutting radial slots (incisions) 7a into the body to an inner circumference, which forms the inner circumferential edge 3a. One of the slots 7a' between adjacent flap portions is contiguous with the slit so as not to restrict the opening of the body during installation or removal.

The flap portions are individually movable between a neutral position and a fully extended position. In the neutral position, the flap portions are arranged so as to minimise the configuration of the aperture or even close the aperture. In the fully extended position, the flap portions are arranged so as to maximise the configuration of the aperture.

Figure 6:
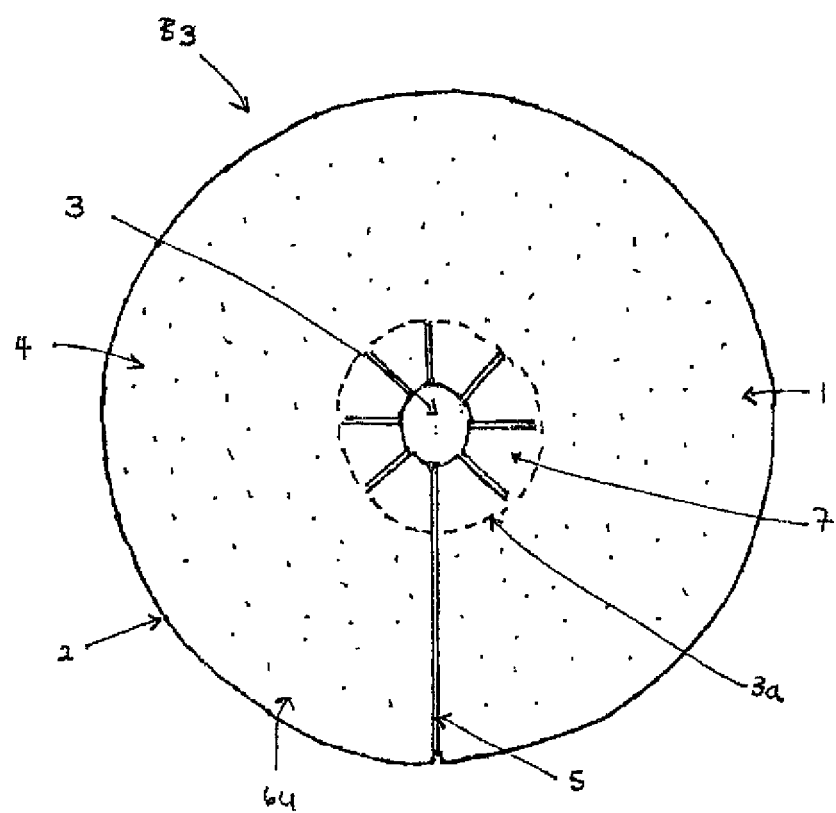
FIG. 6 is a plan view of a third embodiment of a barrier according to the present invention.

In the neutral position, the flap portions may extend in a direction across the aperture 3 from the inner edge 3a of the body in a direction towards a centre point or line of the aperture 3b (see FIGS. 5 and 6). The overall configuration of the aperture is minimised and defined by the inner edges 7b of the flap portions. In an alternative embodiment, the flap portions are configured to extend in a direction across the aperture, meeting at the centre point or line 3b and thereby at least substantially closing the aperture (see FIGS. 7, 9 and 10).

As the flap portions move from a neutral position, at least a part of the flap portions fold (bend) in an upwardly or downwardly direction away from the aperture. The configuration of the aperture changes and is defined by the folded edges of the flaps portions.

Figure 8:
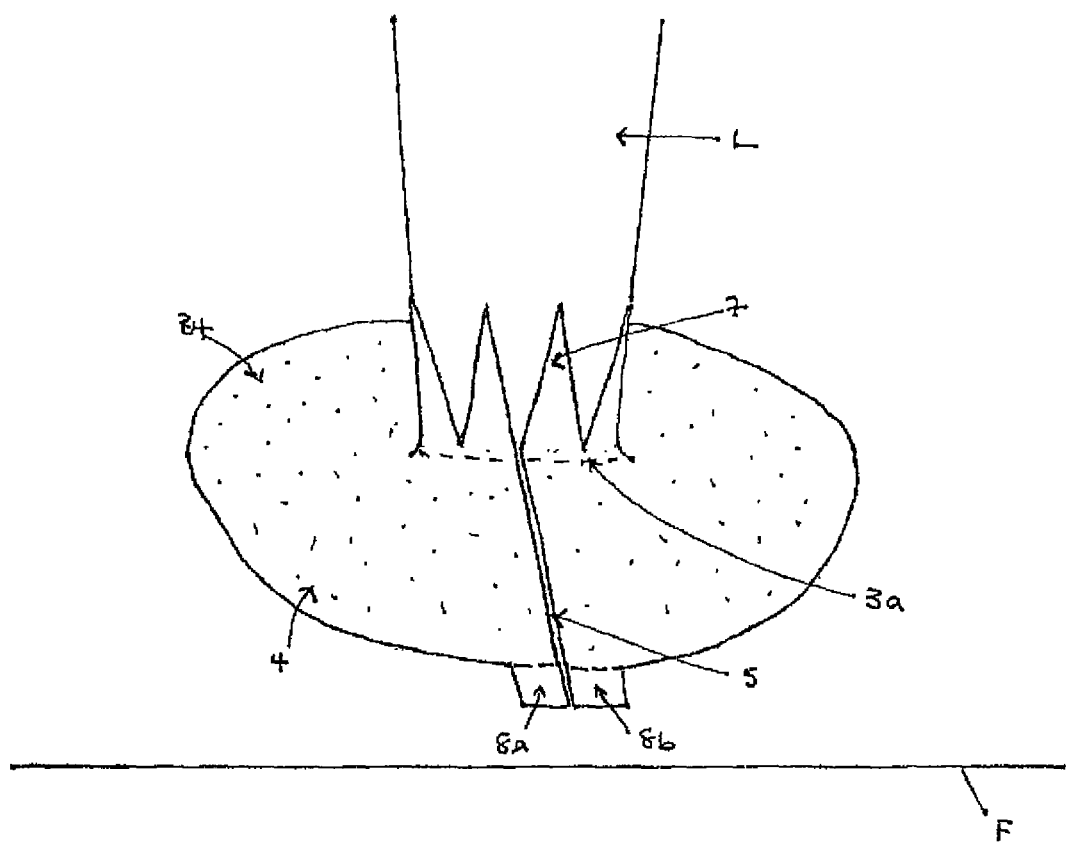
FIG. 8 is a schematic perspective view of the barrier of FIG. 7 mounted on the floor, encircling a leg of a wardrobe.

When the flap portions are arranged in the fully extended position, the flap portions are folded back as far as possible to the inner edge of the body and extend in a direction away from the aperture. As a result, the aperture has a maximum configuration defined by the inner edge of the body as shown in FIG. 8.

The movement of the flap portions depends on the configuration of the leg/wheel of the furniture item. For example, the flap portions may be forced to fold upwardly or downwardly from a neutral position as the open body is extended and closed around the leg/wheel so that the aperture conforms to the size and shape of the leg/wheel.

Depending on the mounting position of the barrier and configuration of the leg/wheel, the flap portions may form a skirt around the leg/wheel and/or extend along the floor.

The barrier comprises a barrier surface 4 deposited on, carried by or arranged in association with the body so as to prevent the crawling insects from traversing across the barrier. The barrier surface may be suitable for inhibiting the motion of at least one type of crawling insect, may be selected according to the furniture item, location and type of crawling insect a user may wish to inhibit. For example, the barrier surface may be selected to be effective against at least bed bugs so that the barrier is suitable for preventing an occurrence of bed bugs in a furniture item. The barrier surface may comprise any suitable means for intercepting crawling insects. For example, the it may comprise a high-tack adhesive layer HT for trapping crawling insects, and/or a material having a low coefficient of friction (not shown) to restrict the purchase available to crawling insects.

The high-tack adhesive to which crawling insects stick on contact, is preferably a non-drying adhesive so as to enhance the longevity of the barrier. The high-tack adhesive may have sufficient tack properties to trap crawling insects such as, for example, bed bugs.

The high-tack adhesive is preferably applied as a layer, particularly preferably a coating on a surface region of the body over which crawling insects will try to crawl when the barrier is mounted for use. Depending on the mounting arrangement of the barrier, the layer of first adhesive may be applied at least substantially across the upper surface of the body so as to trap any crawling insects as they attempt to traverse across the upper surface. Alternatively or additionally, the layer of first adhesive may be applied at least substantially across the lower surface of the body so as to trap any crawling insects as they try to cross the lower surface of the body.

As an alternative, the barrier surface may comprise any material having a sufficiently low coefficient of friction so as to prevent a crawling insect from gaining a foothold on the body. The material may have a coefficient of friction less than 0.4. The low friction material may be ploytetrafluoro-eythlene (PTFE). The low friction material may be applied as a layer, e.g. a coating, on a surface region of the body over which crawling insects may try to crawl when the barrier is mounted for use. For example, the layer of coefficient of friction material may be applied at least substantially over the upper surface and/or the lower surface of the body. Alternatively, the body may be manufactured from a material having a low coefficient of friction.

The barrier may comprise engaging means to help releasably retain the position of the barrier when it is mounted for use. For example, the engaging means may comprise a second adhesive such as a layer of low-tack adhesive LT.

The second adhesive may be any suitable adhesive with sufficient tack properties to removably adhere the barrier to the floor and/or leg/wheel. For example, the second adhesive may be 15 gsm acrylic solution.

The second adhesive is preferably applied as a layer to a surface region of the body that contacts the floor and/or leg/wheel of the furniture item when the barrier is mounted for use. Depending on the mounting arrangement of the barrier, the layer of second adhesive may be applied at least substantially across the lower surface of the body. A layer of second adhesive may also or alternatively be applied to one or more flap portions to removably adhere the flap portions to the floor and/or the leg/wheel of the furniture item. For example, the second adhesive may be applied to an underside of the one or more flap portions. Accordingly, the second adhesive helps to maintain the position of the barrier when mounted for use. The second adhesive also helps to further isolate the furniture item by preventing crawling insects from crawling under the barrier.

The barrier may comprise release liners preferably in the form of silicone-backed release paper R for removably covering the first adhesive layer (HT) and second adhesive layer (LT).

One or both of the release liners may be branded, coloured, patterned and/or have printed instructions to aid the installation and/or removal of the barrier.

When mounting the device for use, the release liner covering the lower layer LT may be peeled away so as to reveal the adhesive layer, to allow the barrier to engage the floor and/or the wheel/leg of the furniture item. The release layer covering the upper layer HT may then be peeled away to reveal the layer HT, whereupon the barrier is ready for use.

The slit 5 extending radially in the body from the boundary to the aperture may be substantially linear or else may be non-linear. The slit forms opposing portions in the body. The body is deemed to be closed when the edges of the opposing portions at least substantially abut or the opposing portions overlap. When the barrier is mounted for use in the closed position around the leg/wheel of the furniture item, the opposing portions of the body may be overlapped so as to adjust the configuration of the aperture (e.g. reduce the size) and thereby improve the fit of the barrier around the leg/wheel.

The barrier may comprise reversible closure means (not depicted) to help maintain the closure of the barrier when mounted for use. The closure means may comprise a movable tab portion that is configured to extend across the opposing portions of the body when the barrier is arranged in the closed position around the leg/wheel of the furniture item.

Figure 7:
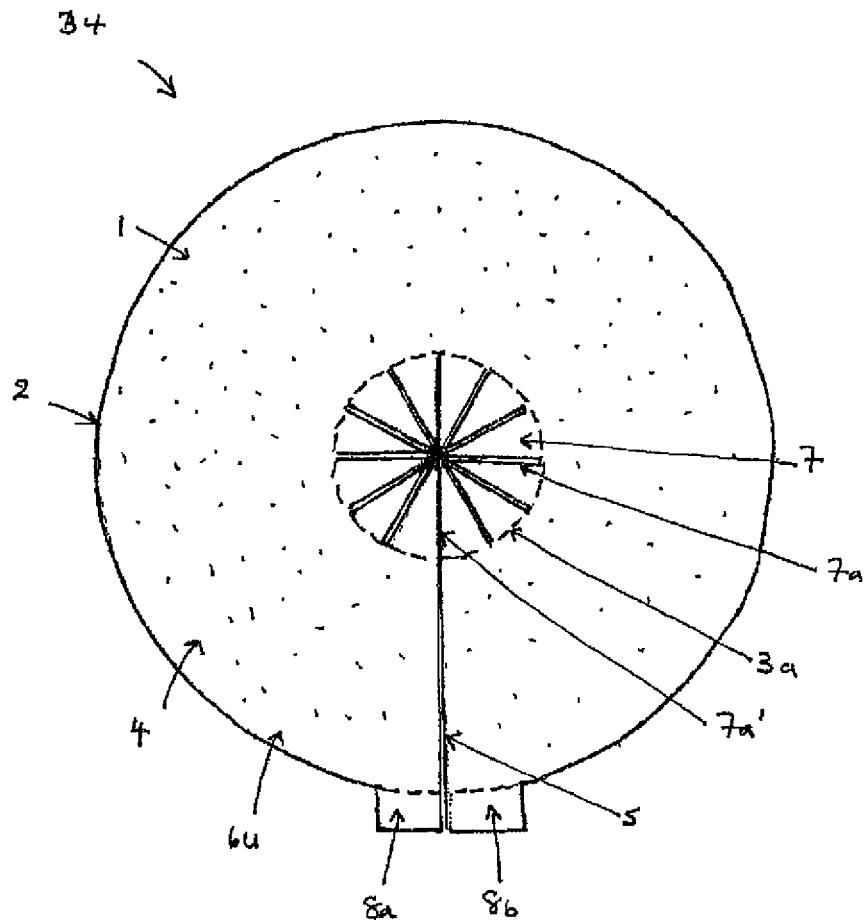
FIG. 7 is a plan view of fourth embodiment of a barrier according to the present invention.

The barrier may comprise at least one finger tab 8 to facilitate the handling of the barrier by a user as shown in FIGS. 5, 7 and 8. For example, the at least one finger tab may aid the maneuvering of the barrier during installation or removal of the device. As a result, the risk of interfering with the inimical surface is minimised.

FIGS. 1-3 depict a first embodiment of the barrier B1 in its simplest form. The barrier comprises a disc body 1 with a circular annular shape. An outer boundary 2 is defined by an outer edge of the body. The diameter of the outer boundary is approximately 12 cm. A central aperture 3 extends through the body from the upper surface to the lower surface. The aperture has a fixed circular configuration defined by an inner edge of the body 3a. The diameter of the central aperture is approximately 5 cm. A layer of 50 gsm high tack acrylic adhesive (dotted pattern 4) extends at least substantially across the upper surface of the body to trap crawling insects. A slit 5 extends radially from the boundary to the inner edge. The slit divides the body so that the barrier can be mounted for use around a leg/wheel of a furniture item by opening the body, slipping the open body around a leg/wheel of a furniture item so that the leg/wheel is located in the aperture and closing the body so that the leg/wheel is encircled by the barrier. In this embodiment, the body is resiliently flexible and biased towards a closed position. The barrier further comprise a releasable liner (not shown) to releasably cover the adhesive on the upper surface. FIG. 1b depicts the first embodiment of the barrier mounted for use around a wheel W of a bed. The barrier is mounted on the floor F and it encircles the wheel. As a result, any crawling insects must cross the upper surface of the barrier to reach the wheel of the bed located in the central aperture of the barrier. However, the crawling insects will be prevented from reaching the wheel by the adhesive.

FIG. 2 depicts a second embodiment of barrier B2. As with the first embodiment, the barrier comprises a disc body 1 with a circular annular shape. The outer boundary 2 is defined by an outer edge. A layer of adhesive (dotted pattern 4) extends at least substantially across the upper surface of the body. A slit 5 extends radially from the boundary to the inner edge. The slit allows the barrier to be mounted for use by opening and closing the barrier around a leg/wheel of the furniture item. In FIG. 5 an alternative embodiment is shown. In this embodiment of the barrier, the central aperture 3 has a variable configuration. The barrier further comprises a plurality of radial flap portions 7 extending from the inner edge 3a to allow the configuration of the aperture to vary. The flap portions are formed by cutting radial slots 7a into the body up to an inner circumference, which forms the circular inner edge 3a. So as not to hamper the opening and closing of the body, one particular slot 7a' is contiguous with the slit. The flap portions are individually movable between a neutral position and a fully extended position. FIG. 5 depicts the flap portions in the neutral position where they extend across the aperture towards a centre point 3b and the aperture has a minimum circular configuration defined by the inner edges 7b of the flaps. In the fully extended position, the flap portions are folded back to the inner edge 3a and so the aperture has a maximum circular configuration defined by the inner edge 3a. In this embodiment, the aperture has a minimum diameter of approximately 5 cm and a maximum diameter of approximately 7 cm. A pair of finger tabs 8a, 8b extends outwardly from the body on either side of the slit so that the user can handle the barrier without touching the adhesive on the upper surface.

FIG. 6 depicts a third embodiment of the barrier B3. The third embodiment has a similar design to the second embodiment as shown in FIG. 5, however it does not include the finger tabs.

FIGS. 7 and 8 depict a fourth embodiment of a barrier B4 having a similar design to the second embodiment as shown in FIG. 5. However, as shown in FIG. 7, the plurality of movable flap portions 7 of this embodiment of the barrier are configured to extend across the aperture to the centre point and close the aperture when they are arranged in the neutral position. FIG. 8 shows how the flap portions are folded back whilst fitting the barrier for use around a leg of a wardrobe so that the aperture can conform to the configuration of the leg. In the particular example depicted in FIG. 8, the flap portions are arranged in the fully extended position where they are folded back as far as the inner edge 3a and form an upwardly extending skirt around a lower portion of the leg. The configuration of the aperture is thereby maximised and defined by the inner edge. So as to help maintain the position of the barrier when mounted for use on the floor, this embodiment of the barrier further comprises a layer of 15 gsm low tack acrylic adhesive across the lower surface of the body and a releasable liner to releasably cover the adhesive when not in use.

Figure 9:
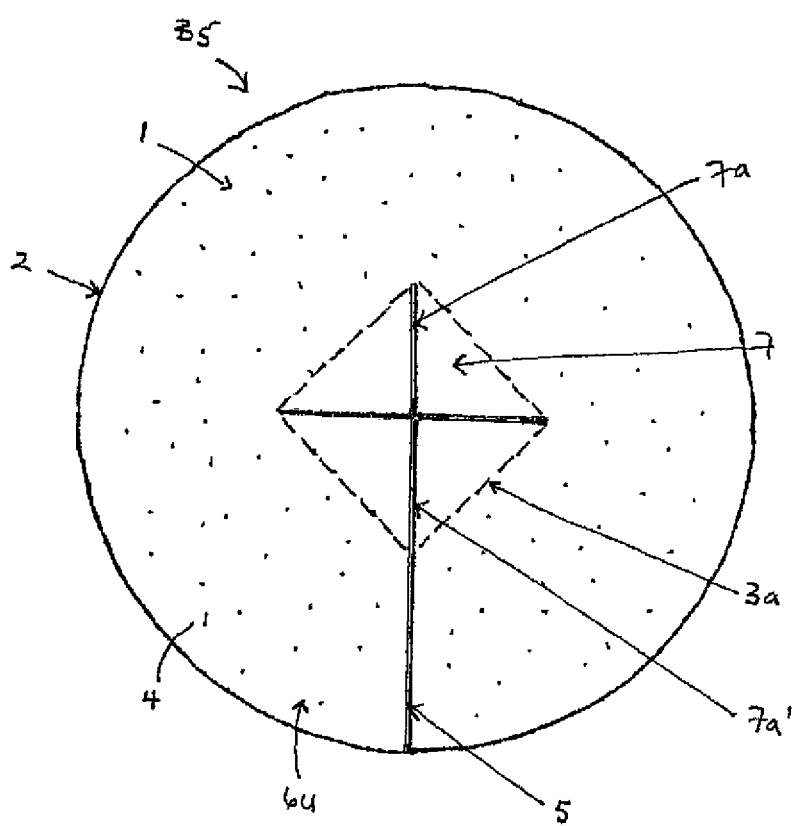
FIG. 9 is a plan view of a fifth embodiment of a barrier according to the present invention.

FIG. 9 depicts a fifth embodiment of the barrier B5. The fifth embodiment has a similar design to the third embodiment as shown in FIG. 6. However, the fifth embodiment of the barrier comprises only four flap portions. The flap portions are formed by cutting four radial slots into the body up to an inner circumference which forms a square inner edge 3*a*. Hence, the aperture 3 has a square shape and the maximum configuration of the aperture is defined by the square inner edge.

Figure 10:
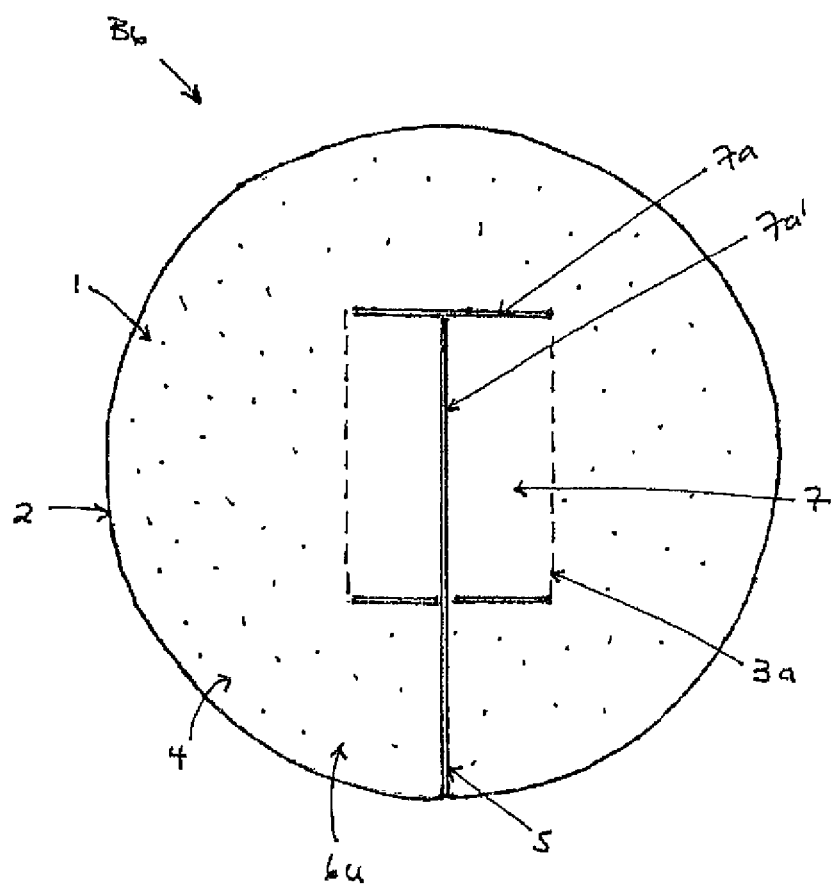
FIG. 10 is a plan view of a sixth embodiment of a barrier according to the present invention.

FIG. 10 depicts a sixth embodiment of the barrier B6. Although similar to the third embodiment as shown in FIG. 6, the sixth embodiment comprises only two flap portions. The two flap portions are formed by cutting slots into the body up to an inner circumference which forms a rectangular inner edge 3*a*. Accordingly, the sixth embodiment has a rectangular shaped aperture 3 with a maximum configuration defined by the rectangular inner edge.

Figure 11:
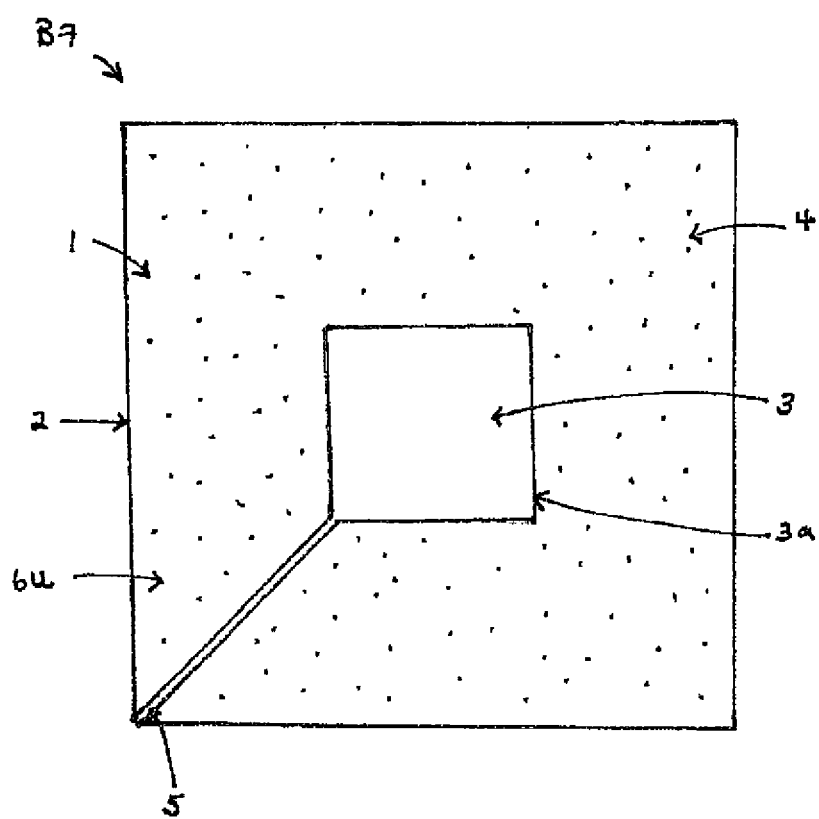
FIG. 11 is a plan view of a seventh embodiment of a barrier according to the present invention.

FIG. 11 depicts a seventh embodiment of the barrier B7. The seventh embodiment has a similar simple design to the first embodiment, however it comprises a disc body 1 with a square annular shape defined by a boundary 2 and an aperture 3 with a fixed square configuration defined by an inner edge 3*a*. A layer of high tack adhesive (dotted pattern 4) extends at least substantially across an upper surface 6U of the body. A slit 5 extends radially, at a diagonal, from a corner of the aperture to a corner of the body to allow the body to be reversibly opened and closed around a leg/wheel of an item of furniture.

In an alternative embodiment (not shown) the barrier can be constructed from separate lengths of material broadly of the type described above, i.e., having a substrate, and barrier surface which may be an adhesive layer or may be a surface having very low friction, in either case inhibiting the motion of a crawling animal. The lengths of material could be placed around an item, such as a leg or castor of an article of furniture in a similar way to that described above. For example, lengths could be placed around the item to form a polygon shape, such as a triangle or rectangle, by positioning the lengths, one after the other, around the item, taking care to ensure that adjacent lengths at least abut, and preferably overlap, so as to leave no gap through which a crawling animal could travel.

In a preferred arrangement, a lower surface of the material is provided with a low-tack adhesive layer LT which is made to adhere to a floor surface. The upper and lower surfaces can be provided with release liners as described above.

Optionally the material can be provided in a roll from which lengths may be cut or torn to size. Alternatively, or in addition, pre-cut lengths may be provided. In accordance with this embodiment, the barrier may be provided as a kit of parts including one or more lengths of material for forming the barrier, together with instructions for installation.

The barrier described above may be conveniently formed as a coated carrier film which may then be slit and, depending on the shape, die-cut, from the web thus formed.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

Throughout the description and claims of this specification, the words "comprise" and "contain", and any variations of the words, means "including but not limited to" and is not intended to (and does not) exclude other features, elements, components, integers or steps.

Throughout the description and claims of this specification, the singular encompasses the plural unless the context requires otherwise. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith.

The invention claimed is:

1. A barrier device for inhibiting access of a crawling animal to an article, the device comprising a generally laminar substrate including a barrier surface for impeding the motion of a crawling animal across the substrate, and characterized in that the device is configurable in a first, operational configuration in which the barrier surface extends substantially continuously around an article, and a second, installation configuration in which a discontinuity is formed in the substrate to permit engagement with the article wherein the device comprises an aperture for accommodating at least a part of the article in the first, operational configuration, and wherein the device has a locating surface on an opposed side of the substrate from the barrier surface, the locating surface comprising an adhesive for maintaining the position of the device on a floor surface in use, and the barrier surface comprising an adhesive surface for adhering to a crawling animal, thereby to impede its motion across the substrate.

2. A barrier device according to claim 1, wherein the device comprises a slit, perforation or line of weakness extending at least part way through the substrate to an edge region thereof, for partly separating the substrate into two portions.

3. A barrier device according to claim 1, wherein the substrate is generally annular in the first, operational configuration in the first, operational configuration.

4. A barrier device according to claim 1, wherein the substrate comprises one or more flap portions adjacent the aperture for contacting an article in the aperture.

5. A barrier according to claim 4, wherein the flap portion is moveable between a first configuration in which it extends substantially in-plane with respect to the substrate and second configuration in which it extends substantially out-of-plane with respect to the substrate.

6. A barrier according to claim 5, wherein in the second configuration the flap is arranged in use to abut an article in the aperture.

7. A method of inhibiting access of a crawling animal to an article, the method comprising substantially surrounding the article with a barrier device comprising a generally laminar substrate having a barrier surface for impeding the motion of a crawling animal across the substrate, characterised in that the method comprises changing the device between a first, operational configuration in which the barrier surface extends substantially continuously around an article, and a second, installation configuration in which a discontinuity is formed in the substrate to permit engagement with and/or withdrawal from an article, and wherein the method comprises at least temporarily affixing the device to a floor surface with an adhesive on an opposed side of the substrate from the barrier surface, and causing a crawling animal to adhere to the barrier surface, thereby to impede its motion across the substrate.

8. A according to claim 7, comprising putting the device into the second configuration by deflecting of at least a part of the device out of plane.

9. A kit of parts for preparing and installing a barrier device for inhibiting access of a crawling animal to an article, the kit comprising at least one length of barrier material comprising a generally laminar substrate having a barrier surface comprising an adhesive for impeding the motion of a crawling animal across the substrate, and characterised in that the barrier material is configurable in a first, operational configuration in which the barrier surface extends substantially continuously around the article, and wherein the substrate has a locating surface on an opposed side of the substrate from the barrier surface, the locating surface comprising an adhesive for engaging a support such as a floor surface in use.

10. A kit according to claim 9, wherein the barrier material is supplied as pre-cut lengths.

11. A kit according to claim 9, wherein the barrier material is supplied as a roll.

* * * * *